(12) United States Patent
Yokoyama et al.

(10) Patent No.: US 8,846,235 B2
(45) Date of Patent: Sep. 30, 2014

(54) BATTERY MODULE

(75) Inventors: Tomohiko Yokoyama, Osaka (JP); Masato Fujikawa, Osaka (JP); Keisuke Shimizu, Osaka (JP); Shunsuke Yasui, Osaka (JP); Daisuke Kishii, Osaka (JP)

(73) Assignee: Panasonic Corporation, Osaka (JP)

( * ) Notice: Subject to any disclaimer, the term of this patent is extended or adjusted under 35 U.S.C. 154(b) by 328 days.

(21) Appl. No.: 13/340,371

(22) Filed: Dec. 29, 2011

(65) Prior Publication Data

US 2012/0258347 A1    Oct. 11, 2012

(30) Foreign Application Priority Data

Apr. 8, 2011    (JP) ................................ 2011-085981

(51) Int. Cl.
*H01M 10/50* (2006.01)
*H01M 6/50* (2006.01)
*H01M 10/613* (2014.01)

(52) U.S. Cl.
CPC ........ *H01M 6/5038* (2013.01); *H01M 10/5004* (2013.01)

USPC ............................................. 429/120; 429/72

(58) Field of Classification Search
CPC ........................ H01M 6/5038; H01M 10/5004
See application file for complete search history.

(56) References Cited

U.S. PATENT DOCUMENTS

| 7,433,794 B1 | 10/2008 | Berdichevsky et al. |
| 2007/0164711 A1 | 7/2007 | Kim et al. |
| 2011/0200856 A1* | 8/2011 | Yasui et al. ................. 429/88 |

FOREIGN PATENT DOCUMENTS

| JP | 2007-200880 | 8/2007 |
| JP | 2009301969 | * 12/2009 |

* cited by examiner

*Primary Examiner* — Ladan Mohaddes
(74) *Attorney, Agent, or Firm* — McDermott Will & Emery LLP

(57) ABSTRACT

A battery module including: a plurality of aligned cells, wherein a cooling unit accommodating a cooling agent is provided in a vicinity of the cells, part of the cooling unit is a vulnerable section having a relatively low compressive strength, and the vulnerable section is unsealed when heat is abnormally generated in at least one of the cells.

5 Claims, 6 Drawing Sheets

BATTERY MODULE

CROSS-REFERENCE TO RELATED APPLICATION

This application claims priority to Japanese Patent Application No. 2011-085981 filed on Apr. 8, 2011, the disclosure of which including the specification, the drawings, and the claims is hereby incorporated by reference in its entirety.

BACKGROUND

The present invention relates to battery modules, and specifically relates to a battery module containing a cooling agent.

In recent years, secondary batteries which can be used repeatedly have been used as power sources for driving mobile electronic devices, portable communication devices, etc., to save resources and conserve energy. Further, to reduce the amount of use of fossil fuel and reduce the amount of emission of carbon dioxide, the secondary batteries have been expected to be used as a power source for driving a vehicle.

Specifically, the technique in which general-purpose batteries are connected together in parallel or in series to form a battery module and in which the battery modules are combined together to be used for various purposes has been adopted. This technique enables downsize and light weight of the battery module by increasing performance of the batteries (cells) which form the battery module. Thus, workability can be improved in combining the battery modules, and flexibility in mounting the battery module in areas of limited space, such as a vehicle, can be increased.

When cells are arranged in intimate proximity to each other, the energy density of a battery module can be increased, and the size of the battery module can be reduced. However, if an internal short-circuit or the like is formed in any one of the cells, and heat is abnormally generated in the cell (hereinafter simply referred to as "in case of abnormal heat generation"), a normal cell located in the periphery of the cell in which heat is abnormally generated (abnormal cell) is subjected to high-temperature heat, so that the abnormally generated heat may spread in a chain reaction. In view of the foregoing, U.S. Pat. No. 7,433,794 B1 proposes a cooling tube capable of releasing a cooling agent in case of abnormal heat generation. The cooling tube is configured such that part of the cooling tube melts in case of abnormal heat generation, and the cooling agent is released when the cooling tube melts. Moreover, Japanese Patent Publication No. 2007-200880 proposes a battery pack in which a fire extinguishing safety apparatus is provided, wherein in case of abnormal heat generation, an extinguishant is sprayed from the fire extinguishing safety apparatus.

SUMMARY

In some cases, such proposed cooling units cannot rapidly cool an abnormal cell. For this reason, there are demands for improvement of the cooling efficiency of the cooling units.

A cooling unit of the present invention is provided in the vicinity of cells, and part of the cooling unit is a vulnerable section having a relatively low compressive strength. When heat is abnormally generated in at least one of the cells, the vulnerable section is unsealed.

As described above, in the cooling unit of the present invention, a section which is unsealed in case of abnormal heat generation is predetermined, and the cooling unit is provided in the vicinity of the cells. Thus, in case of abnormal heat generation, a cooling agent is easily supplied to an abnormal cell.

Note that in the present specification, "the vicinity of cells" is a region subjected to a high temperature (e.g., 150° C. or higher) in case of abnormal heat generation, and includes not only a region adjacent to an abnormal cell, but also a region slightly (e.g., 5 mm or shorter) away from the abnormal cell.

Moreover, in the present specification, "abnormal heat generation" means, for example, that the occurrence of an internal short-circuit, short circuiting, or the like initiates reaction of materials included in a cell, thereby generating heat in the cell. Thus, "abnormal heat generation" in the present specification does not include heat generation in a cell during normal charge/discharge. When heat is abnormally generated in a cell, the temperature of the cell exceeds 150° C., and the temperature of the cell sometimes exceeds 500° C.

DETAILED DESCRIPTION

Figure 1:
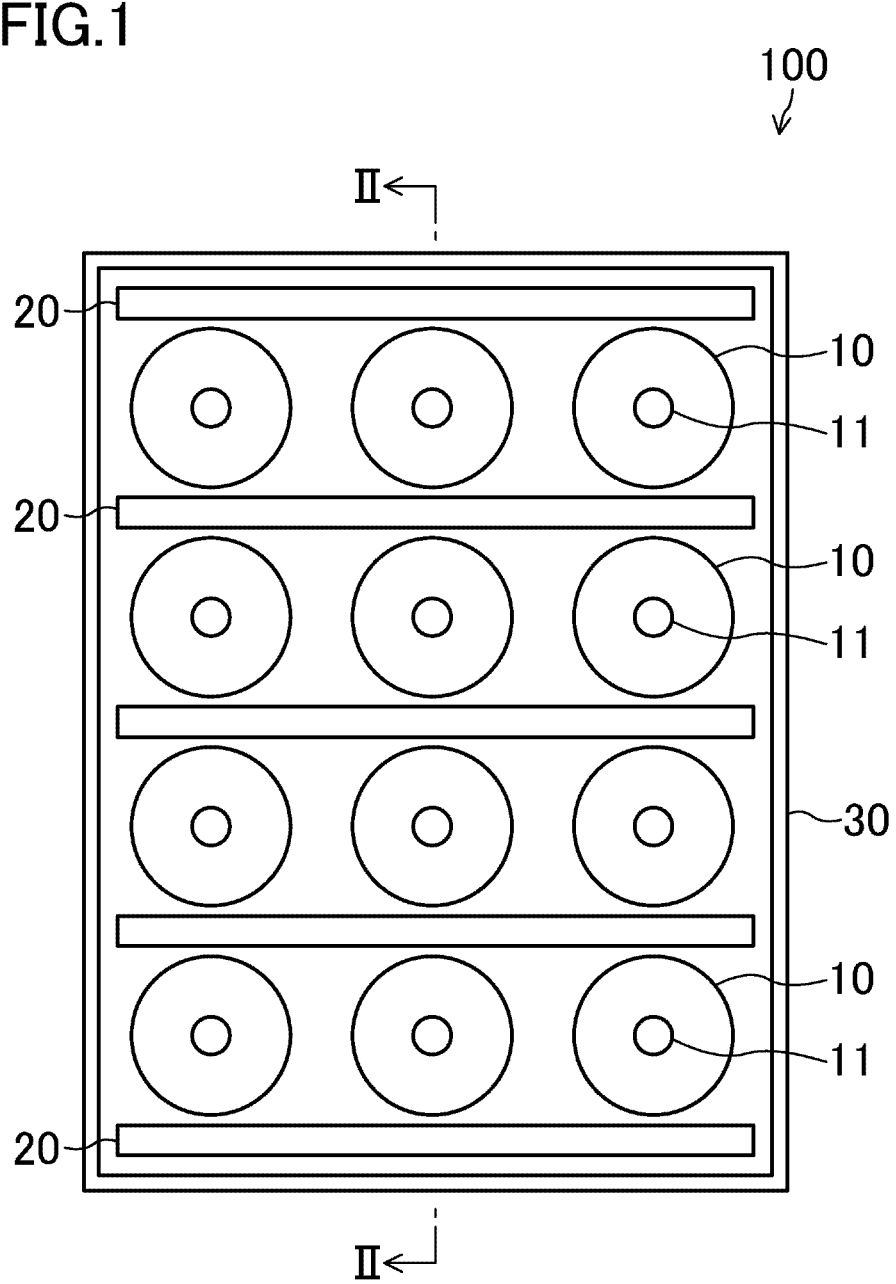
FIG. 1 is a plan view illustrating a battery module of an embodiment of the present invention.

Embodiments of the present invention will be described in detail below with reference to the drawings. The present invention is not limited to the embodiments below. In the following embodiments, like reference numerals refer to like elements.

Embodiment

Figure 2:
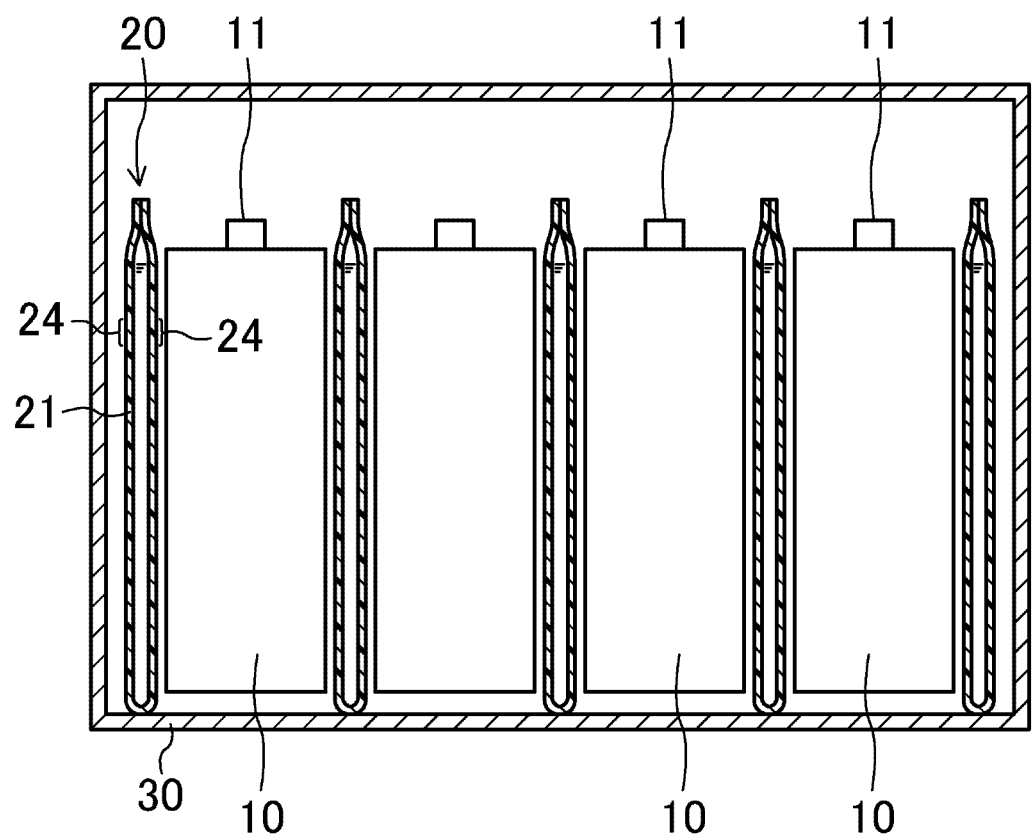
FIG. 2 is a cross-sectional view taken along the line II-II of FIG. 1.
Figure 3:
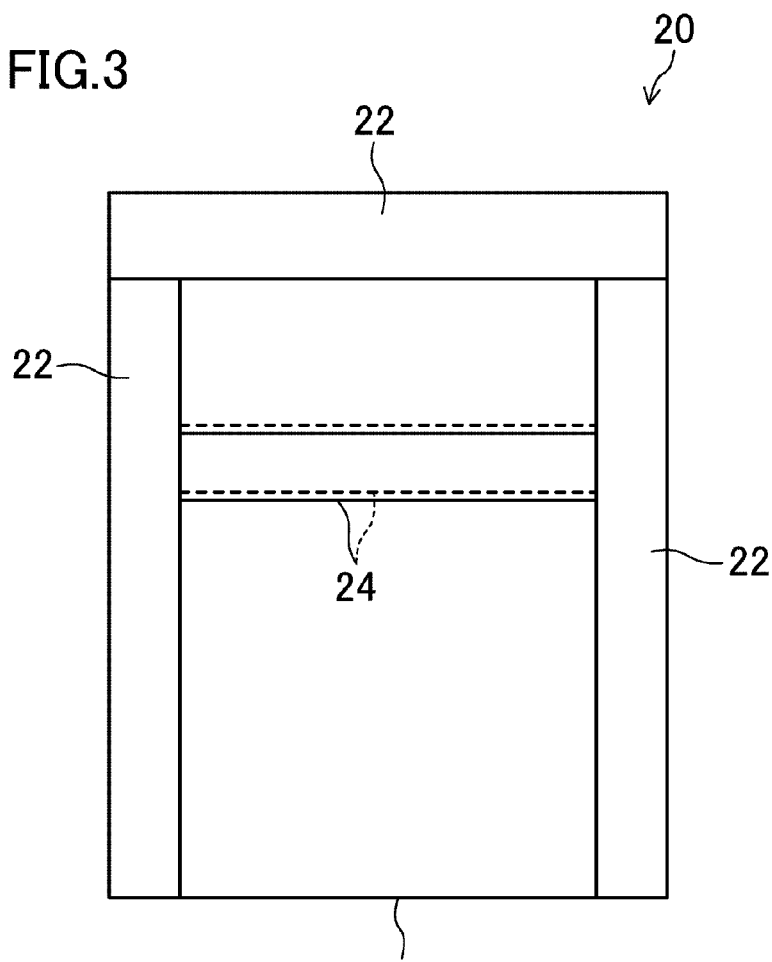
FIG. 3 is plan view illustrating a cooling unit of the embodiment of the present invention.

FIG. 1 is a plan view illustrating a battery module 100 of an embodiment of the present invention. FIG. 2 is a cross-sectional view taken along the line II-II of FIG. 1. FIG. 3 is a plan view illustrating a cooling unit 20 of the present embodiment. Note that in FIG. 2, a side view of cells 10 is shown.

In the battery module 100 of the present embodiment, the plurality of cells 10 are aligned in a matrix pattern. Here, the cells 10 are, for example, cylindrical lithium ion secondary batteries. The cells 10 are accommodated in a case 30 with sealing plates 11 being located at an upper part of the battery module 100. Thus, in the present embodiment, an axial direction of each cell 10 is substantially parallel to a height direction of the case 30.

Cooling units 20 are provided between the respective adjacent cells 10. Each cooling unit 20 is formed by folding back a sheet-like member 21 having a square shape or a rectangular shape when viewed from above, and peripheries of portions of the sheet-like member 21 which overlap with each other when the sheet-like member 21 is folded back are sealed. That is, sealing sections 22 extending over three sides of the cooling unit 20 of the present embodiment are formed. A cooling agent such as water is accommodated in hermetically sealed space of the cooling unit 20.

The sheet-like member 21 is, for example, a laminate film including a fusing layer, a base material layer (metal layer), and an insulating layer which are sequentially stacked from an inside to an outside of the cooling unit 20. The thicknesses of the fusing layer, the base material layer, and the insulating layer may be about 40 μm, about 50 μm, and about 30 μm, respectively. The base material layer may be made of aluminum or stainless steel, and the insulating layer may be made of nylon or polyethylene terephthalate. At the sealing sections 22, parts of the fusion layer which overlap with each other when the sheet-like member 21 is folded back are fused with each other.

Each cooling unit 20 includes a vulnerable section 24 having a relatively low compressive strength. In case of abnormal heat generation, heat is released from an abnormal cell 10, which raises the temperature of the cooling unit 20 located in the vicinity of the abnormal cell 10. As the temperature of the cooling unit 20 increases, the temperature of the cooling agent increases, so that the vapor pressure of the cooling agent increases, which increases the internal pressure of the cooling unit 20. When the internal pressure of the cooling unit 20 exceeds the compressive strength of the vulnerable section 24, the vulnerable section 24 is unsealed, and the cooling agent is released through the vulnerable section 24.

Since the cooling unit 20 is provided between the adjacent cells 10, the cooling agent released through the vulnerable section 24 is supplied to the abnormal cell 10. In this way, the abnormal cell 10 is cooled. Thus, a normal cell 10 can be prevented from being subjected to high-temperature heat, so that it is possible to prevent a chain reaction of abnormal heat generation. In this way, the cooling efficiency of the cooling unit 20 can be improved.

Moreover, when heat is abnormally generated in a cell 10, the cooling unit 20 is unsealed at the vulnerable section 24 to release the cooling agent. Thus, it is not necessary for the battery module 100 to include a temperature sensor for detecting the temperature of the cell 10, an unsealing mechanism for unsealing the cooling unit 20, a control mechanism for driving the unsealing mechanism based on the temperature detected by the temperature sensor, and the like. Therefore, the size of the battery module 100 can be reduced, and the energy density of the battery module 100 can be increased. Next, a specific configuration of the vulnerable section 24 will be described.

For example, the thickness of the base material layer in the vulnerable section 24 may be smaller than the thickness of the base material layer in sections other than the vulnerable section 24. The smaller the thickness of the base material layer in the vulnerable section 24 is, the lower the compressive strength of the vulnerable section 24 is. Therefore, the unsealing of the cooling unit 20 is accelerated, so that the abnormal cell 10 can be rapidly cooled. However, if the thickness of the base material layer in the vulnerable section 24 is too small, the cooling unit 20 may be accidentally unsealed. Based on the foregoing, the thickness of the base material layer in the vulnerable section 24 may be determined. For example, the thickness of the base material layer in the vulnerable section 24 is preferably greater than or equal to 10% and less than or equal to 90%, more preferably greater than or equal to 30% and less than or equal to 70%, of the thickness of the base material layer in the sections other than the vulnerable section 24.

As described above, in case of abnormal heat generation, heat from the abnormal cell 10 raises the temperature of the cooling unit 20, so that the vulnerable section 24 is unsealed. If the cooling unit 20 is in contact with outer surfaces of the cells 10, the heat from the abnormal cell 10 is rapidly transferred to the cooling unit 20 in case of abnormal heat generation, so that the unsealing of the cooling unit 20 can be accelerated. Thus, in order to prevent a chain reaction of abnormal heat generation, the cooling unit 20 is preferably in contact with the outer surfaces of the cells 10, and more preferably, the vulnerable section 24 is in contact with the outer surfaces of the cells 10. However, when it is attempted to form the cooling unit 20 to be in contact with the outer surfaces of the cells 10, the shape, the size, or the like of the cooling unit 20 may be limited. For this reason, inventors of the present application studied the relationship between the distance from the outer surface of the cell 10 (hereinafter simply referred to as "distance") and the temperature in case of abnormal heat generation. Specifically, since an air layer exists at the outer surfaces of the cells 10 (that is, the distance corresponds to the thickness of the air layer), the relationship between the distance and the temperature was computed using the thermal conductivity of air. The results are shown in FIG. 4.

Figure 4:
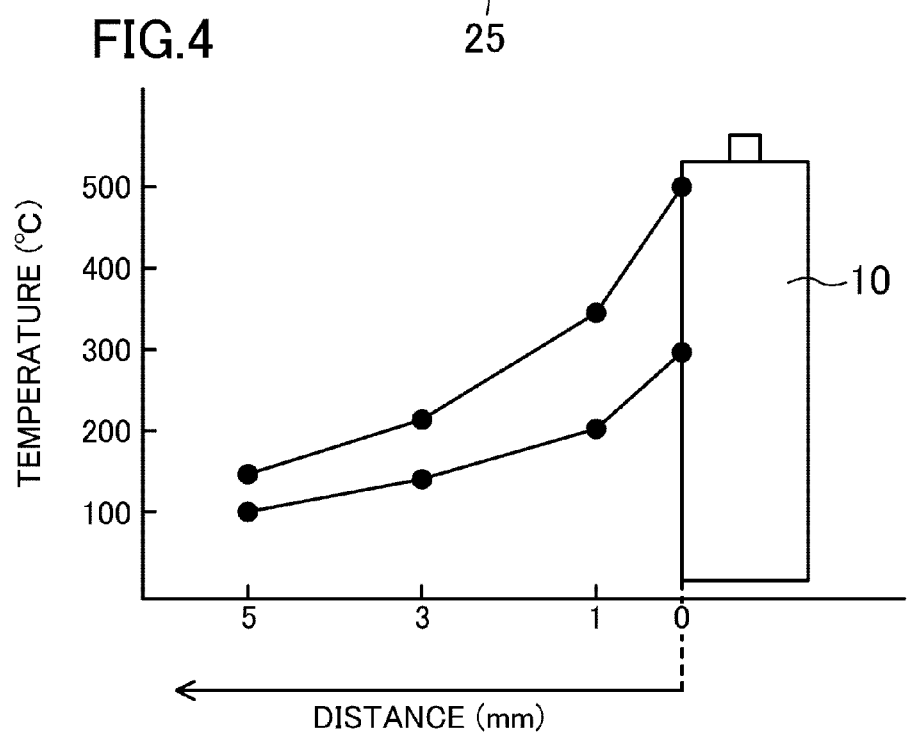
FIG. 4 is a graph illustrating the relationship between the distance from an outer surface of the cell and the temperature in case of abnormal heat generation.

As illustrated in FIG. 4, at a point where the distance is about 3 mm, the temperature is about 150° C. Moreover, when the temperature of the abnormal cell 10 is high, the temperature exceeds 150° C. even at a point where the distance is about 5 mm. From the results, even when the cooling unit 20 is not in contact with the outer surfaces of the cells 10, it may be possible to unseal the cooling unit 20 at the vulnerable section 24 in case of abnormal heat generation. Thus, it is possible to form a cooling unit 20 capable of preventing the chain reaction of abnormal heat generation with a degree of limitation imposed by the shape, the size, or the like being low.

The vulnerable section 24 will be further described. The vulnerable section 24 may be located in the upper part of the battery module 100 (FIG. 2), or may be located in a lower part of the battery module 100. However, when the vulnerable section 24 is located on an upper side of the center of gravity of the cells 10 with the battery module 100 being installed in a vehicle or the like (when the battery module 100 is used), the cooling agent is supplied from an upper side of the abnormal cell 10 in case of abnormal heat generation, so that the surface area of each cell 10 which is in contact with the cooling agent is large. Thus, the abnormal cell 10 can be cooled compared to the case where the vulnerable section 24 is located in the lower part of the center of gravity of the cells 10. Therefore, the vulnerable section 24 is preferably located on the upper side of the center of gravity of the cells 10 with the battery module 100 being used. When the state illustrated in FIG. 2 is the state of using the battery module 100, the vulnerable section 24 is preferably located on a side close to the sealing plates 11 of the cells 10.

The location of the vulnerable section 24 is not limited to that of FIG. 3. However, when the vulnerable section 24 is located in the upper part of the battery module 100, it is possible to obtain the above advantages (that the surface area of the cell 10 which is in contact with the cooling agent in case of abnormal heat generation is large). Moreover, when the cooling unit 20 is accommodated in the case 30 with a folded section 25 facing downward, it is possible to increase the contact area between the cooling unit 20 and the case 30, so that the cooling unit 20 can be stably accommodated in the case 30. In view of the foregoing, the vulnerable section 24 is preferably located on a side opposite to the folded section 25.

Moreover, the vulnerable section 24 may be intermittently formed between the sealing sections 22 facing each other, or two or more vulnerable sections 24 may be provided to one cooling unit 20. In view of ease of manufacture of the cooling unit 20, ease of unsealing of the cooling unit 20 in case of abnormal heat generation, prevention of accidental unsealing of the cooling unit 20, and the like, the location, the size, and the like of the vulnerable section 24 in the cooling unit 20 may be determined.

First Variation

A first variation differs from the above embodiment in terms of the configuration of the vulnerable section. The difference from the above embodiment will be mainly described below.

Figure 5:
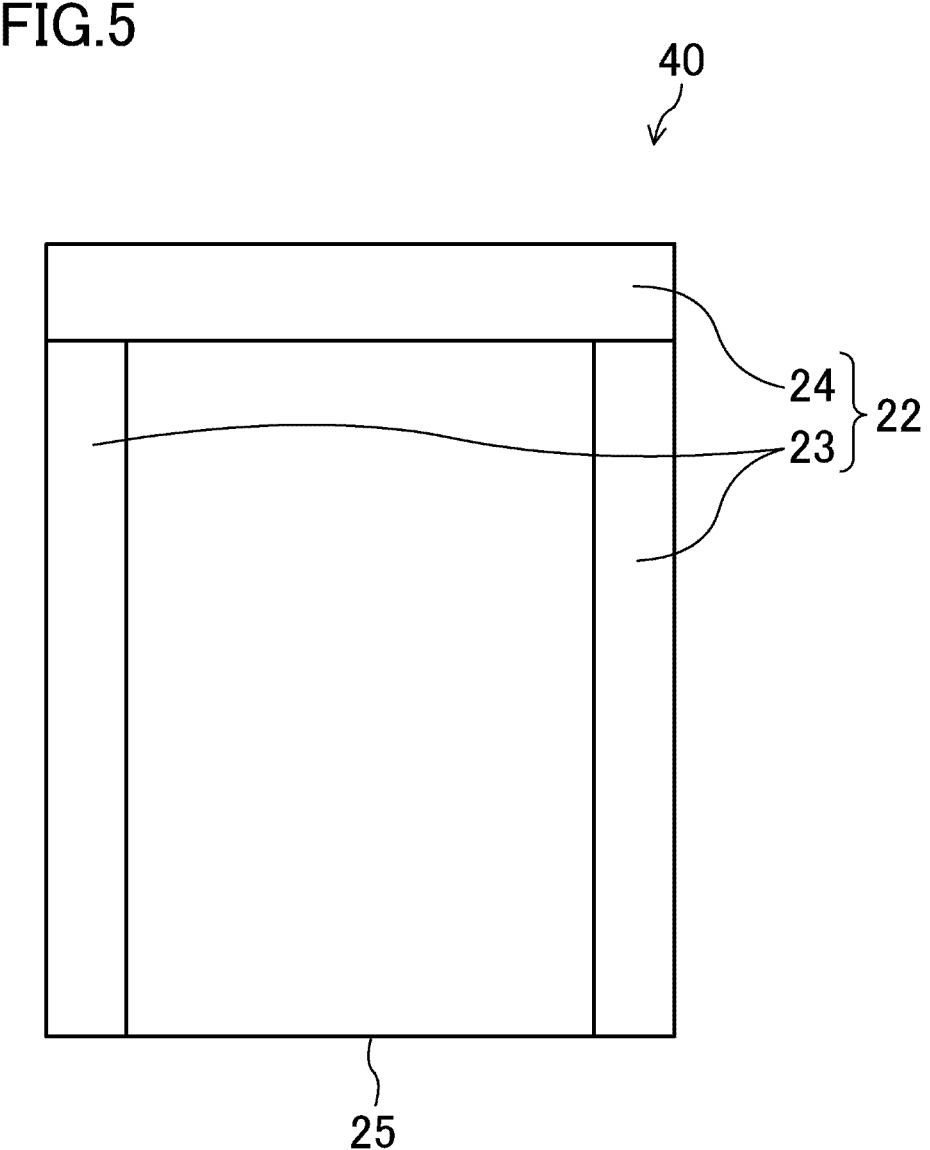
FIG. 5 is a plan view illustrating a cooling unit of another embodiment of the present invention.

FIG. 5 is a plan view illustrating a cooling unit 40 of the present variation.

As illustrated in FIG. 5, a vulnerable section 24 is provided in part of a sealing section 22. That is, the sealing section 22 includes an invulnerable section 23 and the vulnerable section 24. Also in this case, in case of abnormal heat generation, the cooling unit 40 is unsealed at the vulnerable section 24 on a priority basis.

At the vulnerable section 24, the fusing strength of a fusing layer may be relatively low. The lower the fusing strength of the fusing layer at the vulnerable section 24 is, the earlier the cooling unit 40 is unsealed in case of abnormal heat generation, and thus an abnormal cell 10 can be rapidly cooled. However, if the fusing strength of the fusing layer at the vulnerable section 24 is too low, the cooling unit 40 may be accidentally unsealed. In view of the foregoing, the fusing strength of the fusing layer at the vulnerable section 24 may be determined.

In order to obtain a relatively low fusing strength of the fusing layer at the vulnerable section 24, at least one of the following methods (a)-(d) may be selected.

(a): The thickness of the fusing layer is relatively reduced at the vulnerable section 24. For example, the thickness of the fusing layer at the vulnerable section 24 is preferably greater than or equal to 10% and less than or equal to 90%, more preferably greater than or equal to 30% and less than or equal to 70%, of the thickness of the fusion layer at the invulnerable section 23.

(b): The fusing pressure is relatively reduced at the vulnerable section 24. For example, the fusing pressure in forming the vulnerable section 24 is preferably greater than or equal to 10% and less than or equal to 90%, more preferably greater than or equal to 30% and less than or equal to 70%, of the fusing pressure in forming the invulnerable section 23.

(c): The fusing temperature is relatively reduced at the vulnerable section 24. For example, the difference between the fusing temperature in forming the vulnerable section 24 and the fusing temperature in forming the invulnerable section 23 may be larger than or equal to 5° C. and smaller than or equal to 20° C.

(d): The width of the fusing layer is relatively reduced at the vulnerable section 24. For example, the width of the fusing layer at the vulnerable section 24 is preferably greater than or equal to 10% and less than or equal to 90%, more preferably greater than or equal to 30% and less than or equal to 70%, of the width of the fusing layer at the invulnerable section 23.

The vulnerable section 24 may be provided on a side opposite to a folded section 25, or may be provided at the invulnerable section 23 illustrated in FIG. 5. However, for the reason described in the above embodiment, the vulnerable section 24 is preferably located on the side opposite to the folded section 25. Moreover, the vulnerable section 24 may be provided on part of one end of the cooling unit 40.

As described above, in the present variation, the cooling unit 40 includes the vulnerable section 24 similar to the above embodiment, so that it is possible to obtain the advantages offered by the above embodiment.

In addition, in the present variation, the vulnerable section 24 is provided in part of the sealing section 22, so that it is possible to form the cooling unit 40 by varying sealing conditions (sealing pressure, temperature in sealing, shape of the sealing section, etc.) for the vulnerable section 24 and the invulnerable section 23. Thus, the cooling unit 40 can be relatively easily formed, so that the productivity of the cooling unit 40 can be improved. Therefore, the productivity of the cooling unit 40 is increased compared to that of the cooling unit 20 of the above embodiment.

Second Variation

A second variation differs from the above embodiment in terms of the alignment of cells in a battery module. The difference from the above embodiment will be mainly described below.

Figure 6:
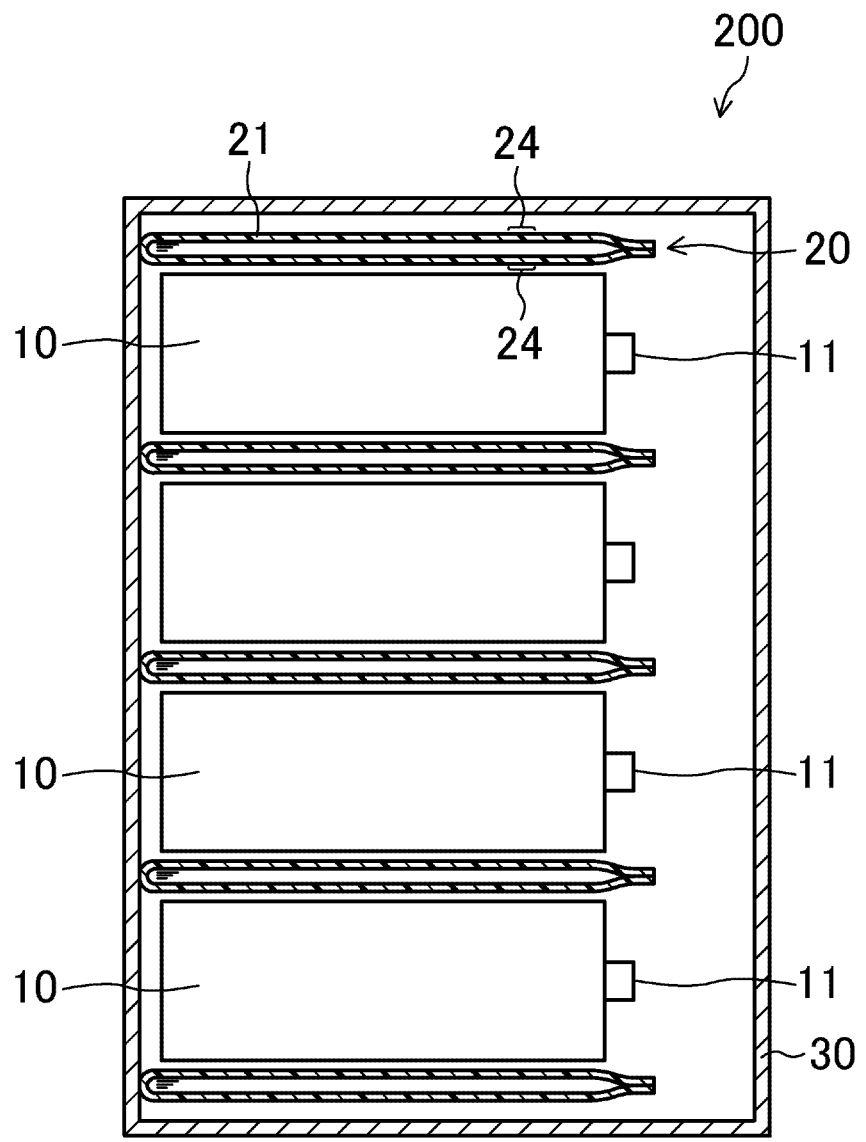
FIG. 6 is a cross-sectional view illustrating a battery module of another embodiment of the present invention.

FIG. 6 is a cross-sectional view of a battery module of the present variation. Note that a side view of cells 10 is shown.

In a battery module 200 of the present variation, the cells 10 are aligned in a horizontal direction and in a vertical direction, and are accommodated in a case 30 so that sealing plates 11 are located in a lateral part of the battery module 200. Thus, in the present variation, an axial direction of each cell 10 is vertical to a height direction of the case 30.

Cooling units 20 are provided between the respective adjacent cells 10. Each cooling unit of the present variation may be the cooling unit 20 of the above embodiment, or may be the cooling unit 40 of the first variation. However, when the cooling unit 40 of the first variation is used, the vulnerable section 24 is located axially or radially outside the cell 10 in the battery module 200. Therefore, in case of abnormal heat generation, most of a cooling agent may fall without being supplied to an abnormal cell 10. In contrast, when the cooling unit 20 of the above embodiment is used, the vulnerable section 24 can be located axially inside the cell 10 in the battery module 200. Therefore, in case of abnormal heat generation, the cooling agent is supplied to most part of the abnormal cell 10. For this reason, it is preferable in the present variation to use the cooling unit 20 of the above embodiment.

Other Embodiments

Each of the above embodiment, the first variation, and the second variation may have the following configuration.

The cooling unit has only to include the vulnerable section 24. The cooling units 20, 40 are mere examples.

Figure 7:
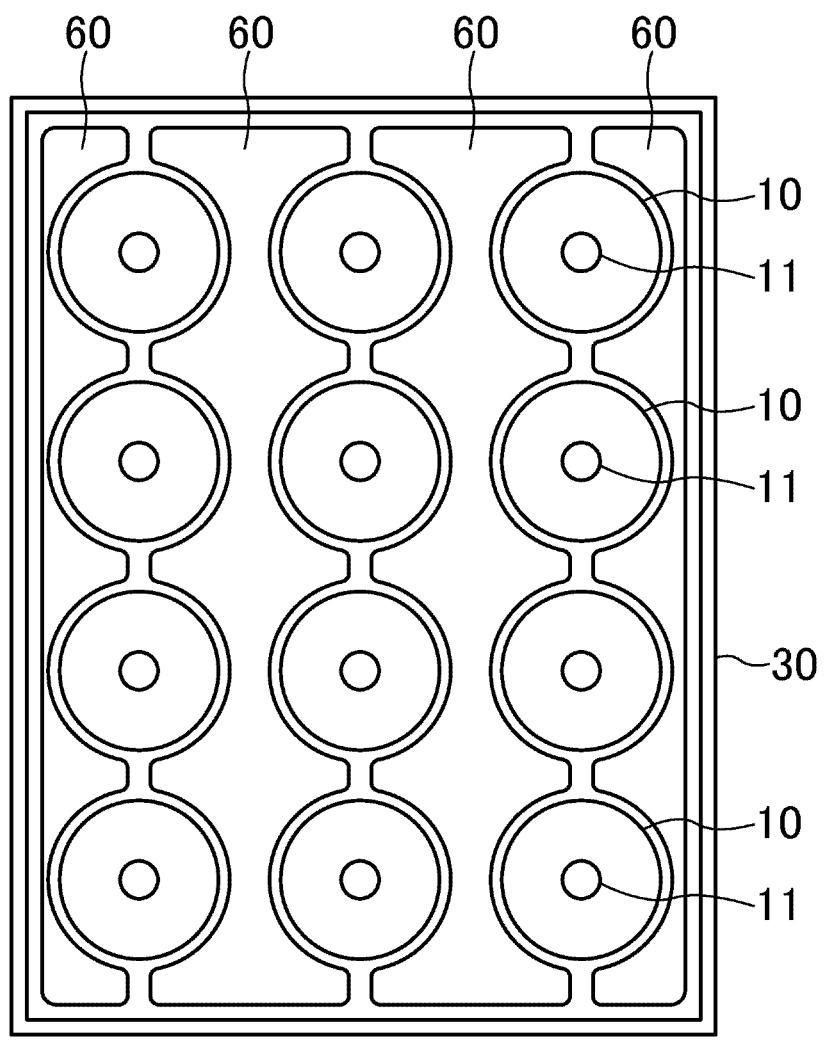
FIG. 7 is a plan view illustrating a battery module of still another embodiment of the present invention.

The shape of the cooling unit is not limited to that of FIG. 1, 2, or 6. The cooling unit may be formed, for example, along outer circumferences of the cells as illustrated in FIG. 7. Since cooling units 60 illustrated in FIG. 7 each can accommodate a large amount of a cooling agent compared to the cooling unit 20 and to the cooling unit 40, the amount of the cooling agent supplied to an abnormal cell 10 in case of abnormal heat generation is large. Thus, compared to the case of using the cooling unit 20 or 40, the abnormal cell 10 can be cooled. Moreover, the shape of the cooling unit when viewed from above is not limited to the rectangular shape, or the square shape.

The cooling unit may be provided on a side close to the sealing plates of the cells, or may be provided on a side close to bottoms of battery cases of the cells. In both cases, the vulnerable section is unsealed in case of abnormal heat generation. However, when the cooling units are provided between adjacent cells, the location of the vulnerable section in each cooling unit can be easily determined. Thus, in case of abnormal heat generation, the cooling agent can be efficiently supplied to an abnormal cell, so that the abnormal cell can be efficiently cooled. Moreover, the productivity of the cooling unit can be improved. Thus, the cooling units are preferably provided between the adjacent cells as illustrated in FIG. 1, 2, 6, or 7. Here, in the above embodiment, the cooling units may be provided between the adjacent cells at least in one of a row direction or a column direction of the battery module. Alternatively, in the second variation, the cooling units may be provided between the adjacent cells at least one of a height direction or a depth direction of the battery module.

One cooling unit may be provided to a plurality of cells, or one cooling unit may be provided to one cell. However, concerning the productivity of the cooling unit, one cooling unit is preferably provided to a plurality of cells as illustrated in FIG. 1 or 7.

The cooling unit may be a housing having a predetermined shape. However, concerning that a vulnerable section is provided to the cooling unit, the cooling unit is preferably made of a sheet-like member.

The number of sheet-like members included in the cooling unit is not limited to those of the embodiment and the variations. However, when the number of the sheet-like members increases, the productivity of the cooling unit decreases, and probability that the cooling unit is accidentally unsealed increases. In view of the foregoing, the number of the sheet-like members may be determined.

The sheet-like member is not limited to the laminate film, and may be a resin film, or the like. Moreover, the base material layer of the laminate film may be made of resin, and the laminate film may not include a protection layer. Moreover, the thicknesses of the fusing layer, the base material layer, and the protection layer included in the laminate film are not limited to those described above.

The cooling agent is not limited to water. However, water has a very high enthalpy of vaporization. Thus, when water is used as the cooling agent, the abnormal cell can be efficiently cooled. Alternatively, the cooling agent may be liquid obtained by mixing ethylene glycol, propylene glycol, glycerine, or the like with water. In this case, it is possible to prevent the cooling agent from freezing under a low temperature. Thus, the battery module can be used under a low temperature (e.g., in cold climate areas). Alternatively, the cooling agent may be a liquid obtained by mixing a thickener such as gelatine with water. In this case, the viscosity of the cooling agent increases, so that the period in which the cooling agent is in contact with the abnormal cell is extended. Thus, the abnormal cell can be cooled.

When the vulnerable section is located on the upper side of the center of gravity of the cells when the battery module is used, a mark indicating up and down directions in a state of using the battery module is preferably provided to the battery module. In this way, it is possible to prevent users from installing the battery module in an apparatus such as a vehicle with the upper side of the battery module facing downward, or vice versa. Thus, in case of abnormal heat generation, the cooling agent can be supplied to most part of the abnormal cell, so that the abnormal cell can be efficiently cooled.

The cells may be connected to each other in series, or in parallel. The battery module preferably includes a connection member for connecting the cells in series or in parallel. Alternatively, the battery module may include an exhaust air duct which is in communication with exhaust holes of the cells.

The number of cells included in a battery module is not limited to that described in FIG. 1, 5, or 7. Alternatively, the cells may be aligned in a row in the battery module.

The cell may be a rectangular lithium ion secondary battery, a laminate battery, or a secondary battery other than a lithium ion secondary battery. The configuration of the cell is not particularly limited, and the cell may have a known configuration of a secondary battery. When the cell is a cylindrical lithium ion secondary battery, an electrode group formed by winding a positive electrode plate and a negative electrode plate with a separator interposed therebetween may be accommodated in a battery case together with an electrolyte.

The case of the battery module may include, for example, a housing having an accommodation section, and a lid body.

What is claimed is:

1. A battery module comprising:
a plurality of aligned cells, wherein
a cooling unit accommodating a cooling agent is provided along an outer circumference of the cells,
the cooling unit includes a vulnerable section having a low compressive strength and an invulnerable section having a high compressive strength,
the vulnerable section is located on an upper side of the center of gravity of the cell in use, and
the vulnerable section is unsealed when heat is abnormally generated in at least one of the cells.

2. A battery module of claim 1, wherein the cooling agent evaporates and increases an internal pressure of the cooling unit to unseal the vulnerable section when heat is abnormally generated in at least one of the cells.

3. The battery module of claim 1, wherein:
the cooling unit is formed by stacking a metal layer and a resin layer, and
the metal layer has a smaller thickness at the vulnerable section than at the invulnerable section.

4. The battery module of claim 1, wherein:
the cooling unit is formed by fusing a sheet-like member, and
the sheet-like member has a lower fusing strength at the vulnerable section than at the invulnerable section.

5. The battery module of claim 1, wherein the cooling unit is formed as a single piece for the plurality of cells.

* * * * *